(12) United States Patent
Caruso et al.

(10) Patent No.: US 11,051,536 B2
(45) Date of Patent: Jul. 6, 2021

(54) OAT BRAN COMPOSITION COMPRISING BETA GLUCAN AND METHOD OF MAKING

(71) Applicant: The Quaker Oats Company, Chicago, IL (US)

(72) Inventors: Pietro Caruso, New York, NY (US); Consuelo Cerdena, Croton on Hudson, NY (US); Christopher E. Graham, Sandy Hook, CT (US); Kathlene A. McManus, Croton on Hudson, NY (US); Gopinathan Meletharayil, Hoffman Estates, IL (US); Alexander Rozanski, Chicago, IL (US); Brian Yu, White Plains, NY (US)

(73) Assignee: The Quaker Oats Company, Chicago, IL (US)

( * ) Notice: Subject to any disclaimer, the term of this patent is extended or adjusted under 35 U.S.C. 154(b) by 82 days.

(21) Appl. No.: 16/516,033

(22) Filed: Jul. 18, 2019

(65) Prior Publication Data
US 2020/0022390 A1  Jan. 23, 2020

Related U.S. Application Data

(60) Provisional application No. 62/700,712, filed on Jul. 19, 2018, provisional application No. 62/737,565, filed on Sep. 27, 2018.

(51) Int. Cl.
*A23L 7/10* (2016.01)
*A23L 2/38* (2021.01)
*A23L 29/25* (2016.01)
*A23L 29/00* (2016.01)

(52) U.S. Cl.
CPC .............. *A23L 7/115* (2016.08); *A23L 2/38* (2013.01); *A23L 29/035* (2016.08); *A23L 29/25* (2016.08)

(58) Field of Classification Search
CPC ........ A23L 7/115; A23L 29/035; A23L 29/25; A23L 2/38
USPC ......................................................... 426/618
See application file for complete search history.

(56) References Cited

U.S. PATENT DOCUMENTS

| | | | | |
|---|---|---|---|---|
| 2008/0187645 | A1* | 8/2008 | Ekblom | A23D 7/013 426/602 |
| 2010/0055249 | A1* | 3/2010 | Rivera | A23L 2/52 426/72 |
| 2010/0298261 | A1* | 11/2010 | Wester | A23L 7/115 514/54 |
| 2015/0351432 | A1* | 12/2015 | Triantafyllou | A23L 2/68 426/29 |

FOREIGN PATENT DOCUMENTS

WO  WO-2009071737 A1 *  6/2009  ............... A23L 7/10

* cited by examiner

*Primary Examiner* — Brent T O'Hern
(74) *Attorney, Agent, or Firm* — G. Peter Nichols; Barnes & Thornburg LLP

(57) ABSTRACT

Providing an oat bran composition that contains water, optionally an acid, and oat bran delivering at least about 0.75 g of beta glucan per serving to provide a heart-healthy and consumer-acceptable product through application of shear to reduce viscosity.

9 Claims, 3 Drawing Sheets

OAT BRAN COMPOSITION COMPRISING BETA GLUCAN AND METHOD OF MAKING

CROSS REFERENCE TO RELATED APPLICATION

This application claims the benefit of and is a nonprovisional of U.S. Provisional Patent Application No. 62/700,712 entitled "An Oat Bran Composition Comprising Beta Glucan and Method of MakingLocation-based Services" filed Jul. 19, 2018, and U.S. Provisional Patent Application No. 62/737,565 entitled "An Oat Bran Composition Comprising Beta Glucan and Method of Making" filed Sep. 27, 2018, which are incorporated by reference in their entirety.

BACKGROUND

Technical Field

The present disclosure relates generally to providing an oat bran composition. For example, the oat bran composition can comprise water and oat bran, delivering at least about 0.75 g of beta glucan per serving and meeting consumer sensory acceptability.

Description of Related Art

Although alternatives to dairy products exist in the market, these products typically fall short of adequately emulating dairy products in the area of mouth feel and sensory attributes. Additionally, existing products, even those made with oat-based ingredients, do not provide certain health benefits, such as low-calorie and heart health claims.

SUMMARY OF THE INVENTION

In a first aspect, the present disclosure relates to an oat bran composition comprising an oat bran slurry comprising water and oat bran, and a viscosity of about 10 to 100 cP when measured at 8° C. and at a shear rate of 50 $s^{-1}$. The oat bran slurry can also comprise an acid. The oat bran composition may also comprise a calcium salt and a pH between 6 and 8 pH.

In a second aspect, the present disclosure provides a method for making an oat bran composition. The method comprises several steps. First, the method comprises combining a starting oat bran concentrate with water to provide an oat bran slurry comprising about 1 to 5 wt. % oat bran in the oat bran slurry. Prior to the applying shear step, the oat bran slurry comprises a first viscosity (measured at 70° C. and at a shear rate of 100 $s^{-1}$). The first step can also comprise combining the starting oat bran concentrate with an acid. For example, the starting oat bran concentrate can be combined with an organic acid.

A second step comprises applying shear at a shear rate of at least 60,000 $s^{-1}$ to the oat bran slurry for a time period sufficient to produce a reduced viscosity oat bran slurry comprising a second viscosity (measured at 70° C. and at a shear rate of 100 $s^{-1}$). The second viscosity is at least about 40% lower than the first viscosity.

Other aspects, embodiments and features of the invention will become apparent from the following detailed description of the invention when considered in conjunction with the accompanying drawings. The accompanying figures are schematic and are not intended to be drawn to scale. In the figures, each identical, or substantially similar component that is illustrated in various figures is represented by a single numeral or notation. For purposes of clarity, not every component is labeled in every figure. Nor is every component of each embodiment of the invention shown where illustration is not necessary to allow those of ordinary skill in the art to understand the invention.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

One of the main challenges with producing dairy alternatives is emulating the mouth feel of dairy beverages. For example, alternatives such as soy milk, almond milk, cashew milk and coconut milk can differ from dairy milk with respect to organoleptic properties, such as viscosity and stringiness. The inventors herein have discovered how to tailor these and other attributes in oat bran-containing beverages to provide a product with desired organoleptic properties, desired health-related benefits, or a combination thereof. Moreover, the inventors have developed a method of making a composition from oat bran such that at least about 0.75 g of beta glucan per serving is present in the composition while also providing desired organoleptic properties, for example, organoleptic properties that emulate the sensory profile of dairy milk.

Isolated oat bran is derived from whole oat grain. Whole oat grain is made up of three parts, including the endosperm, germ, and bran. The term "oat bran" as used herein refers to oat bran that has been isolated from whole oat grains. Isolated oat bran comprises a high concentration of fiber, fatty acids, starch, protein, vitamins, and minerals. In particular, oat bran is rich in beta glucan soluble fiber. Products comprising at least 0.75 g soluble beta glucan fiber per serving of food (for example, 8 fluid ounce or 237 mL beverage serving) meet the United States Food and Drug Administration threshold to support a heart health claim under 21 C.F.R. 101.81.

The invention disclosed and claimed herein relates to oat bran compositions that can be used as an alternative to dairy milk. Dairy milk alternative products are typically liquid, semi-liquid, or semi-solid compositions.

The methods of making dairy alternatives described and claimed herein are accomplished without the use of hydrolysis. Hydrolysis is often used to tailor viscosity, but it frequently has the effect of converting starch to non-starch components like maltodextrins and sugars. Moreover, hydrolysis using certain enzymes, such as glucanase, can also cause harm to the desired soluble fiber content, including the beta glucan content, of the product. Avoiding hydrolysis can help provide a product that is low in sugar relative to similar products formed by implementing a hydrolysis step.

Instead of using hydrolysis, the present invention reduces the viscosity of the oat bran composition by reducing the pH of an oat bran slurry and applying high intensity shear. The application of high intensity shear (or "high shear") can provide enhanced organoleptic properties of the product, for example, reduced viscosity, reduced sliminess or stringiness, more desirable taste, or a combination thereof. At the same time, the use of shear to produce these favorable attributes avoids the need to use hydrolysis. The resulting final oat bran composition retains a heart health claim and exhibits good consumer acceptability.

Figure 1:
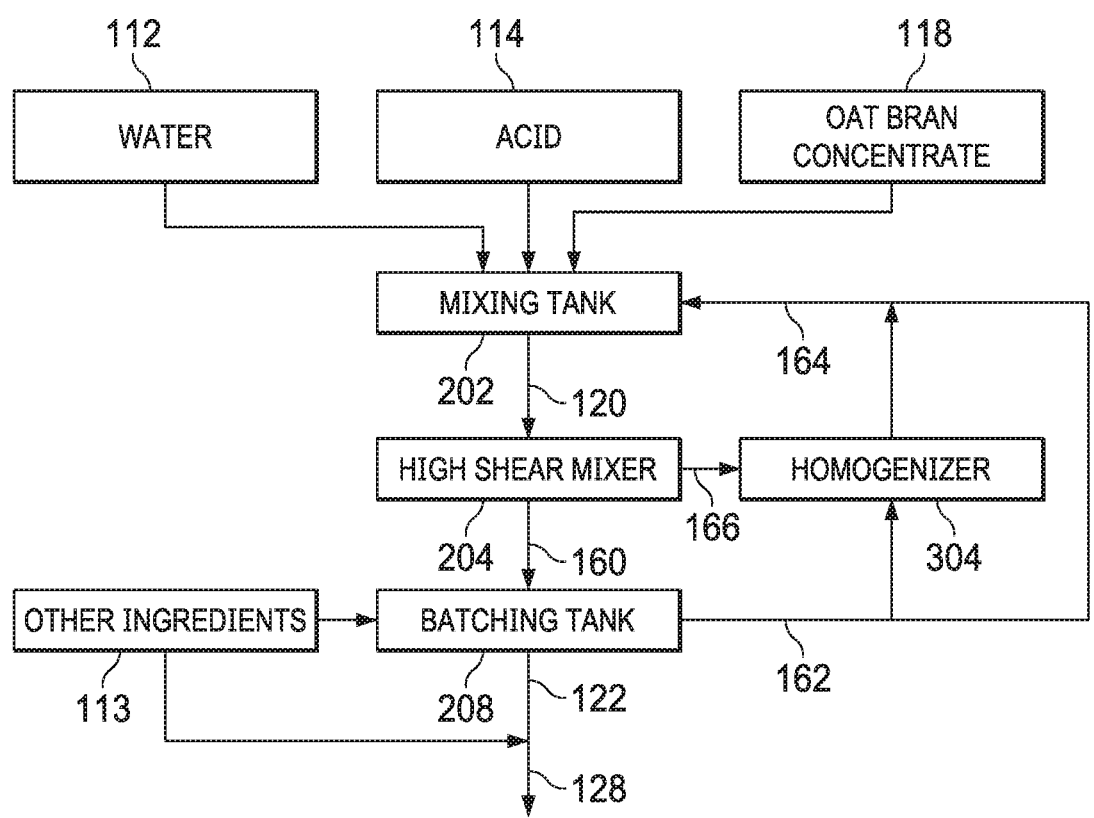
FIG. 1 depicts a schematic block flow diagram illustrating one embodiment of a high shear process for producing an oat bran composition.

One example of a method for forming an initial oat bran slurry and applying high shear to it is depicted as a block flow diagram in FIG. 1. As shown therein, water 112 is mixed with an acid 114 and starting oat bran concentrate 118 inside a mixing tank 202 to form an initial oat bran slurry 120. In an alternative embodiment, the acid 114 and/or starting oat bran concentrate 118 may be added to the water 112 after the water 112 has begun circulating through the high shear mixing system. In a preferred embodiment, the mixing occurs at a temperature of about 60° C. to 90° C. In a most preferred embodiment, the mixing occurs at a temperature of about 70° C. to 75° C.

In a preferred embodiment, the acid 114 is an organic acid. In some embodiments, the acid 114 comprises citric acid. In some embodiments, the acid 114 comprises ascorbic acid. It is also possible to use other food grade acids known to those skilled in the art. The amount of acid 114 can be adjusted to maintain a pH of about 3 to 6 pH in the initial oat bran slurry 120. Preferably, the pH of the initial oat bran slurry 120 is adjusted and maintained during processing at a pH between 4 and 5.

The starting oat bran concentrate 118 is an oat bran ingredient that has been separated from a whole oat product, as described above, and thereby concentrated. The starting oat bran concentrate 118 may, in some embodiments, comprise an oat bran powder, or an oat bran flour, with a particle size of about 75 to 150 μm. In one embodiment, the oat bran powder can comprise a beta glucan content of about 28 wt. % beta glucan. For example, the oat bran powder can comprise from 27 wt. % to 29 wt. % beta glucan. In one embodiment, the initial oat bran slurry can comprise 1 to 5 wt. % oat bran. In a preferred embodiment, the initial oat bran slurry can comprise 3 to 4 wt. % oat bran.

The initial oat bran slurry 120 is then passed to a high shear mixer 204 to apply high rates of shear. The high shear mixer 204 may be a single high shear mixing unit or multiple high shear mixing units arranged in parallel or series, or a combination thereof. In a preferred embodiment, the oat slurry is recirculated back through the high shear mixer 204 at least twice, with or without also passing through a batching tank 208 and/or a homogenizer 304 during a recirculation pass. Further, one or more heat exchangers (not shown) may be used at various locations in the process flow to maintain a desired temperature range.

In one embodiment involving recirculation through the high shear mixer 204, the stream 166 exiting the high shear mixer 204 is passed to a homogenizer 304, and the stream 164 exiting the homogenizer 304 is transferred to the mixing tank 202. In another embodiment involving recirculation through the high shear mixer 204, the stream 160 exiting the high shear mixer 204 is passed to a batching tank 208. A recirculation stream 162 exiting the batching tank 208 may be transferred to a homogenizer 304 or recirculated directly back to the mixing tank 202. When a homogenizer 304 is used, it may be operated at, for example, at least about 2500 psi.

One example of a high shear mixer that can be used in accordance with the present invention is a high-shear mixer made by Quadro Engineering Corp., Model HV0. The Quadro HV0 high-shear mixer is capable of applying a shear rate of over 200,000 s$^{-1}$ to the oat bran slurry. Other high shear mixers are also available that are capable of shear rates of greater than 60,000 s$^{-1}$, greater than 90,000 s$^{-1}$, or greater than 120,000 s$^{-1}$. Homogenizers can apply shear rates of greater than 1,000,000 s$^{-1}$.

The inventors have found that the amount of shear that is applied to the oat slurry has a major effect on reducing viscosity. For example, in one experiment, a stand-alone tank was used with a high shear mixer that mixed the oat bran slurry at a shear rate of 30,000 s$^{-1}$. The inventors found that no matter the amount of time this shear rate was applied, no viscosity reduction was achieved. Thus, the inventors found that a shear rate of greater than 30,000 s$^{-1}$ was required. For example, a high shear rate of at least 60,000 s$^{-1}$ was required to achieve the desired viscosity reduction. For example, a high shear rate of about 200,000 s$^{-1}$ or more was required to achieve the desired viscosity reduction. In one embodiment, a shear rate of between 60,000 s$^{-1}$ and about 10,000,000 s$^{-1}$ was used to achieve the desired viscosity reduction.

Figure 3:
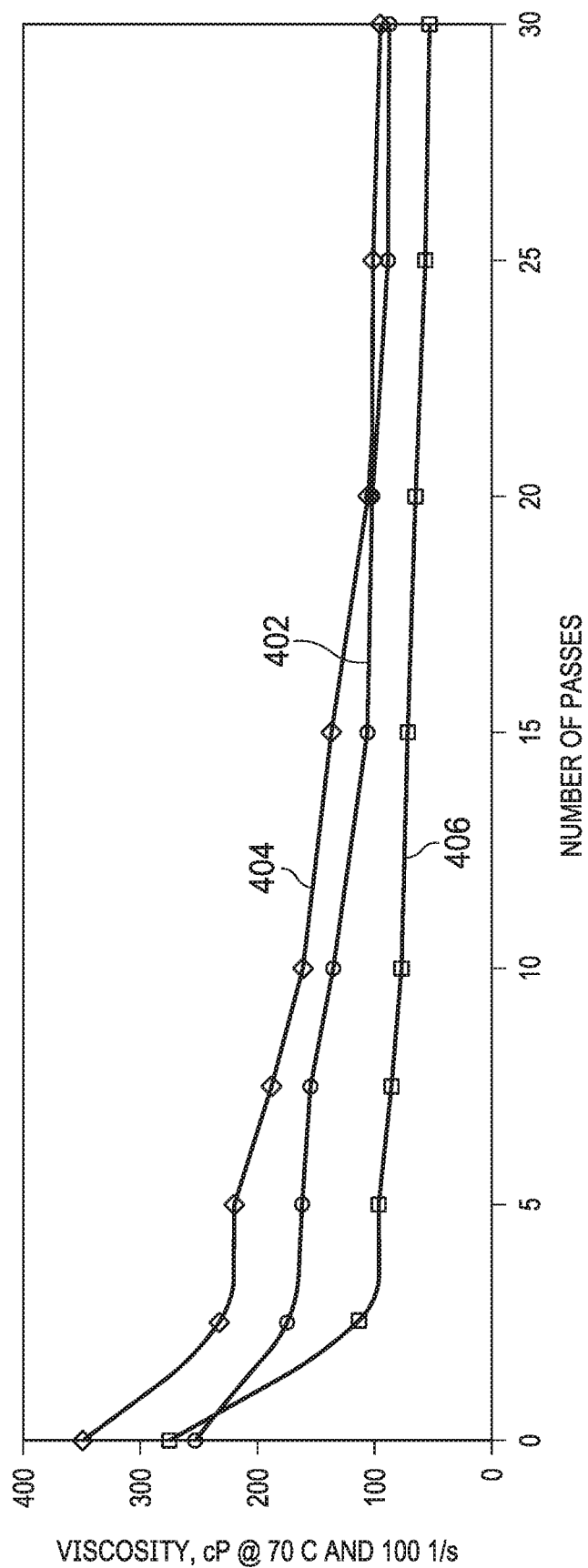
FIG. 3 depicts the influences of temperature and pH on the viscosity of an exemplary 3.3 wt. % oat bran slurry after application of shear.

The inventors have found that the temperature of the initial oat bran slurry influences how effectively the application of shear to the initial oat bran slurry will reduce its viscosity. FIG. 3 illustrates the influences of temperature and pH on the viscosity of an exemplary 3.3 wt. % oat bran slurry after application of shear using the Quadro HV0 high-shear mixer referenced above. In FIG. 3, line 402 represents a 3.3 wt. % oat bran and water slurry mixed at 72° C., which had a viscosity of about 270 cP (measured at 70° C. and 100 s$^{-1}$) prior to any application of shear. In contrast, line 404 represents a 3.3 wt. % oat bran and water slurry at mixed 90° C. which had a viscosity of about 350 cP (measured at 70° C. and 100 s$^{-1}$). The starting viscosity was higher for the oat bran slurry that was mixed at a temperature of 90° C. than it was for the oat bran slurry that was mixed at a temperature of 72° C. As each of the slurries 402 and 404 were subjected to shear from the high-shear mixer for 30 passes using with the Quadro HV0 using a progressive cavity tooling set, the oat bran slurry 404 mixed at 90° C. consistently showed higher viscosity until at least 15 passes through the high-shear mixer.

The inventors have also found that the addition of an acid to the oat bran slurry to reduce pH influences the shear time needed to adequately reduce the viscosity of the oat bran slurry. For example, as shown in FIG. 3, an oat bran slurry at 72° C. which was pH adjusted using ascorbic acid 406 had a starting viscosity of about 270 cP (measured at 70° C. and 100 s$^{-1}$). However, after less than 5 passes through the high-shear mixer, the viscosity was much lower as compared to the viscosity of the oat bran slurry at 72° C. that was not pH adjusted 402. The non-pH adjusted slurry had a pH between about 6 and 7 pH. Similar experiments were carried out using citric acid, and similar results were obtained. Although an acid is not required to produce a reduced viscosity oat bran slurry, it can substantially reduce the time and energy required to accomplish viscosity reduction.

Without being bound to any particular theory, it is believed that the starch and beta glucan forms a loose, 3-dimensional matrix during processing, which is sometimes referred to as starch gelatinization. Starch gelatinization is often associated with high viscosity and a stringy or slimy texture. Mechanical shear physically breaks apart the matrix that is formed, and therefore reduces the viscosity and sliminess. Once the breakage occurs, it is believed that the acidification and shear inhibit the reforming of the matrix by altering starch gelatinization and pasting properties of the oat bran slurry. The study results depicted in FIG. 3 provide evidence of the synergistic effect of acidification and mechanical shear on the oat bran slurry. The inventors have also found the exponential relationship of the viscosity reduction after a number of high-shear mixer passes, finding diminishing utility of subsequent passes after only 2 or 3 passes.

The initial oat bran slurry 120 comprises, prior to the applying high shear step, a first viscosity (measured at 70° C. and at a shear rate of 100 s$^{-1}$). In one embodiment, the first viscosity of the initial oat bran slurry can be greater than about 200 cP when measured at 70° C. and at a shear rate of 100 s$^{-1}$. For example, the viscosity of the initial oat bran slurry before shearing the initial oat bran slurry can be from about 200 cP to about 400 cP (measured at 70° C. and at a shear rate of 100 s$^{-1}$).

High shear is applied to the initial oat bran slurry 120 to produce a reduced viscosity oat bran slurry 122 comprising a second viscosity (measured at 70° C. and at a shear rate of 100 s$^{-1}$). In one embodiment, the high shear is applied for a time period or a number of passes until the second viscosity is at least about 40% lower than the first viscosity. In some embodiments, the second viscosity is about 50% to 75% lower than the first viscosity.

For example, after the initial oat bran slurry 120 is subjected to high shear, the second viscosity of the reduced viscosity oat bran slurry 122 can be about 40 cP to 150 cP when measured at 70° C. and at a shear rate of 100 s$^{-1}$. In a preferred embodiment, the second viscosity is between about 40 cP and about 100 cP when measured at 70° C. and at a shear rate of 100 s$^{-1}$.

In some embodiments, the oat bran slurry is recirculated through the high shear mixer 204 until the oat bran slurry reaches the desired viscosity. In some embodiments, the oat bran slurry is recirculated for at least 2 passes through the high shear mixer, or in another embodiment, about 15 to 60 minutes. As shown in FIG. 1, one recirculation loop or "pass" comprises a loop through a high shear mixer and can also include one or a combination of a mixing tank, a batching tank, a homogenizer or a heat exchanger (not shown).

Once the pH-adjusted oat bran slurry has achieved the desired viscosity, the reduced viscosity oat bran slurry may, if desired, be cooled to a temperature below about 45° C., or below about 35° C. In one embodiment, the cooling is accomplished by adding ambient temperature water to provide a cooled oat bran slurry. Added water can also be used to reduce the total solids content of the oat bran slurry at various points during the process. In some embodiments, a heat exchanger can be used, with or without added water, to assist with cooling the reduced viscosity oat bran slurry 122 more quickly.

Also after the oat bran slurry has achieved the desired reduced viscosity, other ingredients 113 may be added in the batching tank 208, for example, and the resulting flavored and/or thickened oat bran slurry 128 may be further processed as described herein below.

Other ingredients may include, for example, additional water, oils, flavors, sweeteners, thickeners, or salts. For example, the oat bran composition can comprise a vegetable oil, such as high oleic sunflower oil. The oat bran composition may also comprise a thickening agent. When a thickener or thickening agent is added to the oat bran slurry during processing, the oat bran slurry may be referred to as a thickened oat bran slurry.

For example, the oat bran composition can comprise gellan gum, preferably high methoxy gellan gum (HMB). The level of gellan gum included in the oat bran composition, if any, significantly influences the viscosity of the oat bran composition. Exemplary oat bran compositions described herein were produced using varying levels of gellan gum. Table 1 below demonstrates the effect of gellan gum concentration on oat bran composition viscosity.

TABLE 1

Effect of Gellan Gum on Oat Bran Composition
Effect of Gellan Gum on Oat Bran Composition

| Gellan Gum (wt. %) | Oat Bran Composition Viscosity (cP) |
| --- | --- |
| 0 | 11 |
| 0.025 | 18 |
| 0.05 | 32 |
| 0.075 | 42 |

The viscosities reported for the oat bran compositions in Table 1 (all beverages made according to the inventive method) were measured at a temperature of 8° C. and a shear rate of 50 s$^{-1}$. Thus, in one embodiment of the present invention, gellan gum is included in the composition at a level between 0 and 0.075 percent by weight of the oat bran composition. Varying the level of gellan gum in the oat bran compositions of the present invention allows a practitioner to customize the beverage viscosity according to consumer acceptability and consumer liking scores.

The oat bran composition can also comprise high solubility inulin (HSI) and/or gum acacia. Sweeteners including, but not limited to, brown sugar, liquid sugar, alternate sweetener, or a combination thereof may also be added. In some embodiments, zero sweeteners are added. In some embodiments, sodium chloride is added. In some embodiments, calcium carbonate is added. In some embodiments the flavor can comprise, for example, cocoa powder, vanilla, or combinations thereof. When a flavor is added to the oat bran slurry during processing, it may be referred to as a flavored oat bran slurry or a flavored, thickened oat bran slurry.

In one embodiment, a base is added to the reduced viscosity oat bran slurry to raise the pH back up to approximately neutral. For example, calcium salts, such as calcium carbonate or tricalcium phosphate, may be added to increase the pH. In this embodiment, the final pH of the oat bran composition is between 6 pH and 8 pH, or about 7 pH.

Figure 2:
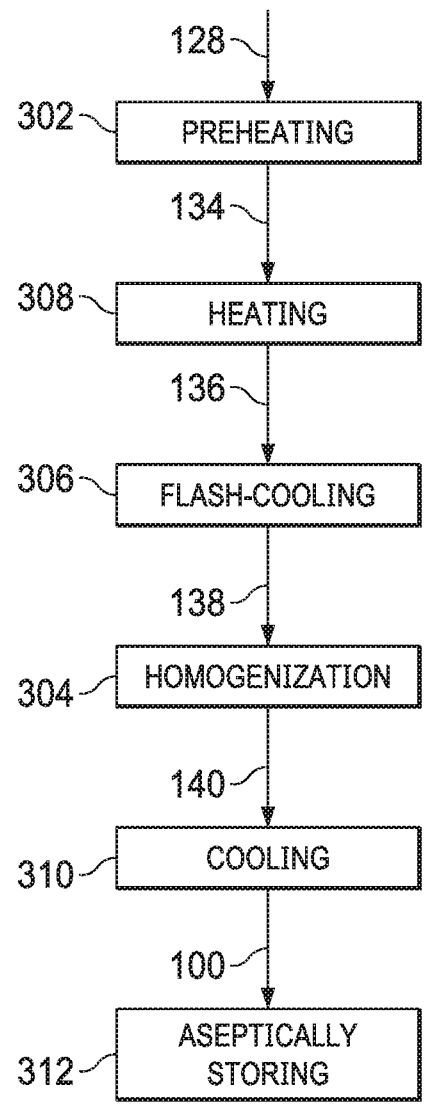
FIG. 2 depicts a schematic block flow diagram illustrating one embodiment of thermal processing steps used for producing an oat bran composition.

These other ingredients may be added at different points following the high shear mixing step, but prior to the thermal processing step described with reference to FIG. 2 below. The other ingredients may also be added as a single stream containing all additional ingredients or as multiple streams containing single ingredients or combinations of ingredients.

After all additional ingredients have been added to the reduced viscosity oat bran slurry, the flavored and/or thickened oat bran slurry 128 is subjected to thermal processing. FIG. 2 depicts a block flow diagram illustrating exemplary thermal processing steps that may be used in accordance with the present disclosure. Other thermal processing or other processing steps to provide a safe beverage to consumers, such as high pressure processing, could also be applied.

The thermal processing step can comprise preheating 302 the flavored and/or thickened oat bran slurry 128 to at least about 77° C. to provide a preheated oat bran slurry 134. In this embodiment, the next thermal processing step comprises heating 308 the preheated oat bran slurry 134 to at least about 139° C. for about 3 to 15 seconds to provide a heated oat bran slurry 136. The heated oat bran slurry 136 is then passed to a flash-cooling 306 stage, where the heated oat bran slurry 136 is cooled to about 79 to 82° C. to provide a flash-cooled oat bran slurry 138. The flash-cooled oat bran slurry is then subjected to homogenization 304 at about 2500 to 3500 psi to provide a homogenized oat bran slurry 140. The homogenized oat bran slurry 140 is then cooled 310 to less than about 18° C. to provide the final oat bran composition 100. The final oat bran composition 100 may then be aseptically stored 312 while awaiting packaging. For example, the storing step 312 can comprise storing the oat bran composition 100 in an aseptic container at a temperature of less than about 5° C. The foregoing thermal processing steps are exemplary and it will be appreciated that the conditions of the thermal processing steps (e.g. sterilization temperatures and times) can vary from system to system based on hold tube length, flow rate, and desired end use (e.g. extended shelf life, aseptic, or shelf stable).

The final oat bran composition comprises an oat bran slurry comprising water, oat bran, optionally a food-grade acid, and other ingredients such as flavorants and thickeners. In some embodiments, the oat bran composition comprises about 3 to 10 wt. % total solids. In preferred embodiments, the total solids content of the oat bran composition is between about 4 and 6 wt. %. Total solids content can be measured using any method known in the art. For example, the weight of a sample before and after liquid is removed by heating can be used to determine the total solids content in terms of weight percent.

In one embodiment, at least a portion of the total solids of the oat bran composition comprises undissolved solids in suspension in the oat bran composition. For example, the undissolved solids are in suspension in the oat bran composition when at least 90% (e.g., at least 90, 91, 92, 93, 94, 95, 96, 97, 98 or 99% and up to 100%) by volume of the oat bran composition is a single solid-in-liquid suspension at the end of a suspension test. The suspension test comprises: (i) providing 100 mL of the oat bran composition at 20° C. in a graduated cylinder and in air at 20° C., the graduated cylinder having an inner diameter of 3 cm, having an inner height of 25 cm and being configured to measure at least 100 mL of water contained by the graduated cylinder; (ii) closing the graduated cylinder so that the oat composition will not escape from the graduated cylinder during a mixing step; (iii) performing the mixing step by vertically orienting a central axis of the graduated cylinder and vertically oscillating the graduated cylinder at an amplitude of 2.5 cm so that the graduated cylinder is displaced 2.5 cm above and 2.5 cm below a starting position at a rate of 1 oscillation per second for 15 seconds; and (iv) allowing the graduated cylinder to remain stationary for 2 hours after the mixing step.

In one embodiment, the final viscosity of the oat bran composition can be about 10 to 30 cP when measured at 8° C. and at a shear rate of 50 $s^{-1}$. In a preferred embodiment, the final viscosity of the oat bran composition is between 13 and 21 cP when measured at 8° C. and at a shear rate of 50 $s^{-1}$. These viscosity ranges are advantageous for producing a diary milk alternative beverage. Other viscosities are possible for other beverages. For example, a smoothie-type beverage could comprise a viscosity up to 100 cP when measured at 8° C. and at a shear rate of 50 $s^{-1}$.

The viscosity values described herein were measured using an Anton Paar stress-controlled rheometer using cup and bob geometry and Peltier temperature control system. Viscosity values are given herein as measured by this device at a given temperature and shear rate.

In some embodiments, the final oat bran composition can comprise about 1.0 to 2.0 wt. % oat bran. In a preferred embodiment, the oat bran is nonhydrolyzed. A nonhydrolyzed oat bran is oat bran that has not been subjected to enzymatic hydrolysis. For example, the oat bran composition can comprise about 1.185 wt. % oat bran. In some embodiments, the pH of the oat bran composition is 6 to 8 pH.

EXAMPLES

One example of a method and composition of the present disclosure is set forth below. Table 2 contains an exemplary composition of a starting oat bran concentrate used in the example methods of making example oat bran compositions according to the principles of the invention described above.

TABLE 2

| Starting Oat Bran Concentrate | |
|---|---|
| Component | wt. % |
| Lipids | 5 |
| Beta-glucan | 28 |
| Other Dietary Fiber | 24 |
| Fat | 5 |
| Protein | 23 |
| Moisture | 5 |
| Carbohydrate | 9 |
| Minerals and Vitamins | 1 |

Table 3 contains an exemplary oat bran composition that is unsweetened.

TABLE 3

| Unsweetened Oat Bran Composition | |
|---|---|
| Component | wt. % |
| Oat Bran | 1.185 |
| Inulin | 1.100 |
| Sunflower Oil | 1.000 |
| Calcium Carbonate | 0.3426 |
| Gum Acacia/Gum Arabic | 0.200 |
| Flavors | 0.055 |
| Gellan gum | 0.030 |
| Vitamin Premix | 0.0045 |
| Water | 96.05 |

The unsweetened oat bran composition is an oat bran beverage comprising, per 8 fluid ounce serving, 30 calories, 0 grams of sugars, 4 grams of dietary fiber including 3 grams of soluble fiber, and 0.75 grams of beta glucan.

Table 4 contains an exemplary oat bran composition that is sweetened.

TABLE 4

Sweetened Oat Bran Composition (Original)

| Component | wt. % |
|---|---|
| Oat Bran | 1.185 |
| Inulin | 1.100 |
| Sunflower Oil | 1.030 |
| Calcium Carbonate | 0.3426 |
| Gum Acacia/Gum Arabic | 0.200 |
| Flavors | 0.189 |
| Sugar | 2.000 |
| Gellan gum | 0.030 |
| Vitamin Premix | 0.0045 |
| Citric Acid | 0.0300 |
| Water | 93.8887 |

The sweetened oat bran composition (original) is an oat bran beverage comprising, per 8 fluid ounce serving, 50 calories, 5 grams of sugar, 4 grams of dietary fiber including 3 grams of soluble fiber, and 0.75 g of beta glucan.

Table 5 contains an exemplary oat bran composition that is flavored with vanilla flavoring and is sweetened.

TABLE 5

Sweetened Oat Bran Composition (Vanilla)

| Component | wt. % |
|---|---|
| Oat Bran | 1.185 |
| Inulin | 1.100 |
| Sunflower Oil | 1.030 |
| Calcium Carbonate | 0.3426 |
| Gum Acacia/Gum Arabic | 0.200 |
| Flavors | 0.279 |
| Sugar | 2.000 |
| Gellan gum | 0.030 |
| Vitamin Premix | 0.0045 |
| Citric Acid | 0.0300 |
| Water | 93.7987 |

The sweetened oat bran composition (vanilla) is an oat bran beverage comprising, per 8 fluid ounce serving, 50 calories, 5 grams of sugar, 4 grams of dietary fiber including 3 grams of soluble fiber, and 0.75 g of beta glucan.

The process for producing the exemplary oat bran compositions shown in Tables 3-5 was completed in four stages. First, an oat bran slurry with reduced viscosity was formed; second, additional ingredients, such as flavors and thickening agents, were added to flavor and texturize the reduced viscosity oat bran slurry; third, solids were adjusted by adding water until a desired solids content was achieved; and fourth, thermal processing by direct ultra high temperature (UHT) was performed to treat the product.

In the first step in producing the reduced viscosity oat bran slurry, water was injected into a high shear mixing system according to FIG. 1 at a temperature of about 62 to 82° C. Once the desired flow rate was established, the homogenizer pressure was set to a pressure of at least 2500 psig and the high shear mixer was increased to 60 Hz (70 m/s tip speed). As the water was filled into the batch tank, citric acid was added to the solution to produce an acidic solution. Once the water level reached about 75% of the set point for a 3.3 wt. % oat bran slurry, an oat bran powder, having the composition summarized in Table 1 above, was then added slowly with the remaining water. The oat bran slurry was then recirculated for at least 67 minutes between the batch tank, the homogenizer, and the high shear mixer. A heat exchanger was used to maintain a temperature of about 62 to 82° C. during recirculation. In some examples, citric acid was added at this stage if the pH was higher than 4.6.

In the second stage, where additional ingredients are added, pressure was removed from the homogenizer and the high shear mixer was reduced to 30 Hz or less. The flowrate on the recirculation loop was increased and the homogenizer was bypassed in the loop. For the unsweetened oat bran composition of Table 3, the following ingredients were added: first, the calcium carbonate was added; second, at a temperature below 54° C., inulin was added along with vegetable oil and gum acacia; third, at a temperature below 45° C., gellan gum was added. For the sweetened oat bran composition of Tables 4 and 5, all of the ingredients for the unsweetened oat bran composition were added along with the other ingredients listed in Tables 4 and 5. The flavored, thickened oat bran slurry was then recirculated through the batch mixer, high shear mixer and heat exchanger.

In the third step, water was added until the desired solids content of 4 to 6 wt. % was reached. The flavored, thickened oat bran slurry was then chilled to a temperature below 5° C. in a chilled storage tank.

In the fourth step, the flavored, thickened oat bran slurry was moved from the chilled storage tank to the thermal processing system and preheated to a temperature of at least 77° C. The preheated oat bran slurry was then heated to a temperature of 139° C. or higher. After heating, the heated oat bran slurry was then flash-cooled to 79 to 82° C. Next, the flash-cooled slurry was homogenized at a pressure of 2500 to 3000 psig. The homogenized oat bran slurry was moved to a cooling heat exchanger and cooled to a temperature of less than 5° C. to provide the oat bran composition. The oat bran composition was then aseptically stored at a temperature of less than 5° C.

ADDITIONAL EMBODIMENTS

The following descriptive embodiments are offered as further support of the disclosed invention:

In a first embodiment, novel aspects described in the present disclosure are directed to an oat bran composition comprising: an oat bran slurry comprising water and oat bran; and wherein the oat bran composition comprises a viscosity of about 10 to 100 cP when measured at 8° C. and at a shear rate of 50 $s^{-1}$.

In another aspect of the first embodiment, the oat bran composition comprising: an oat bran slurry comprising water and oat bran; and wherein the oat bran composition comprises a viscosity of about 10 to 100 cP when measured at 8° C. and at a shear rate of 50 $s^{-1}$; and further comprises one or more limitations selected from the following:

wherein the oat bran slurry comprises about 1 to 5 wt. % oat bran;

wherein the oat bran slurry comprises a viscosity of about 40 to 150 cP when measured at 70° C. and at a shear rate of 100 $s^{-1}$;

wherein the oat bran slurry comprises 0.01 to 0.05 wt. % citric acid;

wherein the oat bran slurry comprises about 0.05 to 0.1 wt. % ascorbic acid;

wherein the oat bran composition comprises High Methoxy Gellan Gum (HMB);

wherein the oat bran composition comprises gum acacia;

wherein the oat bran composition comprises inulin;

wherein the oat bran composition is a beverage comprising between 1 and 2 wt. % oat bran, and at least about 0.75 g of beta glucan per 8 fluid ounce (237 mL) serving;

wherein the oat bran composition comprises between 0 and 0.075 wt. % gellan gum;

wherein the oat bran composition comprises about 3 to 10 wt. % total solids, wherein at least a portion of the total solids of the oat bran composition are undissolved solids in suspension in the oat bran composition.

In second embodiment, novel aspects of the present disclosure are directed to a method for making an oat bran composition, comprising combining a starting oat bran concentrate with an acid and water to provide an oat bran slurry comprising about 1 to 5 wt. % oat bran in the oat bran slurry and a first pH between 3 and 6 pH, wherein the oat bran slurry comprises a first viscosity (measured at 70° C. and at a shear rate of 100 $s^{-1}$) prior to applying shear; and applying shear at a shear rate of at least about 60,000 $s^{-1}$ to the oat bran slurry to produce a reduced viscosity oat bran slurry comprising a second viscosity (measured at 70° C. and at a shear rate of 100 $s^{-1}$), wherein the second viscosity is at least about 40% lower than the first viscosity.

In another aspect of the second embodiment, novel aspects of the present disclosure are directed to a method for making an oat bran composition, comprising combining a starting oat bran concentrate with an acid and water to provide an oat bran slurry comprising about 1 to 5 wt. % oat bran in the oat bran slurry and a first pH between 3 and 6 pH, wherein the oat bran slurry comprises a first viscosity (measured at 70° C. and at a shear rate of 100 $s^{-1}$) prior to applying shear; applying shear at a shear rate of at least about 60,000 $s^{-1}$ to the oat bran slurry to produce a reduced viscosity oat bran slurry comprising a second viscosity (measured at 70° C. and at a shear rate of 100 $s^{-1}$), wherein the second viscosity is at least about 40% lower than the first viscosity; and comprising one or more limitations selected from the following:

cooling the reduced viscosity oat bran slurry to less than about 45° C. by adding ambient water to provide a cooled oat bran slurry; mixing the cooled oat bran slurry with additional ingredients comprising High Methoxy Gellan Gum (HMB) to provide a thickened oat bran slurry; and reducing an total solids content of the thickened oat bran slurry by adding water;

wherein the additional ingredients comprise at least one ingredient chosen from the group consisting of inulin, calcium carbonate, vegetable oil, and gum acacia;

comprising adding a calcium salt to the reduced viscosity oat bran slurry to provide the reduced viscosity oat bran slurry with a second pH between 6 and 8 pH;

comprising thermal processing the thickened oat bran slurry to provide the oat bran composition;

wherein the thermal processing comprises: preheating the thickened oat bran slurry to at least about 77° C. to provide a preheated oat bran slurry; heating the preheated oat bran slurry to at least about 139° C. for about 3 to 15 seconds to provide a heated oat bran slurry; flash-cooling the heated oat bran slurry to about 79 to 82° C. to provide a flash-cooled oat bran slurry; homogenizing the flash-cooled oat bran slurry at about 2500 to 3500 psig to provide a homogenized oat bran slurry; and cooling the homogenized oat bran slurry to less than about 18° C. to provide the oat bran composition; and aseptically storing the oat bran composition; and further comprising homogenizing the oat bran slurry at a pressure of between about 2000 and 3500 psig.

Although the present disclosure has provided many examples of systems, apparatuses, and methods, it should be understood that the components of the systems, apparatuses and method described herein are compatible and additional embodiments can be created by combining one or more elements from the various embodiments described herein. As an example, in some embodiments, a method described herein can further comprise one or more elements of a system described herein or a selected combination of elements from any combination of the systems or apparatuses described herein.

Furthermore, in some embodiments, a method described herein can further comprise using a system described herein, using one or more elements of a system described herein, or using a selected combination of elements from any combination of the systems described herein.

Although embodiments of the invention have been described with reference to several elements, any element described in the embodiments described herein are exemplary and can be omitted, substituted, added, combined, or rearranged as applicable to form new embodiments. A skilled person, upon reading the present specification, would recognize that such additional embodiments are effectively disclosed herein. For example, where this disclosure describes characteristics, structure, size, shape, arrangement, or composition for an element or process for making or using an element or combination of elements, the characteristics, structure, size, shape, arrangement, or composition can also be incorporated into any other element or combination of elements, or process for making or using an element or combination of elements described herein to provide additional embodiments. For example, it should be understood that the method steps described herein are exemplary, and upon reading the present disclosure, a skilled person would understand that one or more method steps described herein can be combined, omitted, re-ordered, or substituted.

Additionally, where an embodiment is described herein as comprising some element or group of elements, additional embodiments can consist essentially of or consist of the element or group of elements. Also, although the open-ended term "comprises" or "comprising" is generally used herein, additional embodiments can be formed by substituting the terms "consisting essentially of" or "consisting of" for "comprising".

Where language, for example, "for" or "to", is used herein in conjunction with an effect, function, use or purpose, an additional embodiment can be provided by substituting "for" or "to" with "configured for/to" or "adapted for/to."

Additionally, when a range for a particular variable is given for an embodiment, an additional embodiment can be created using a subrange or individual values that are contained within the range. Moreover, when a value, values, a range, or ranges for a particular variable are given for one or more embodiments, an additional embodiment can be created by forming a new range whose endpoints are selected from any expressly listed value, any value between expressly listed values, and any value contained in a listed range. For example, if the application were to disclose an embodiment in which a variable is 1 and a second embodiment in which the variable is 3-5, a third embodiment can be created in which the variable is 1.31-4.23. Similarly, a fourth embodiment can be created in which the variable is 1-5.

As used herein, examples of "substantially" include: "more so than not," "mostly," and "at least 30%, 40%, 50%, 60%, 70%, 80%, 90%, 95%, 96%, 97%, 98% or 99%" with respect to a referenced characteristic.

As used herein, examples of "about" and "approximately" (when not specifically defined) include a specified value or characteristic to within plus or minus 30%, 25%, 20%, 15%, 10%, 5%, 4%, 3%, 2%, or 1% of the specified value or characteristic.

Unless otherwise specified, percentages of a component in a composition are given in terms of weight percentages.

While this invention has been particularly shown and described with reference to preferred embodiments, it will be understood by those skilled in the art that various changes in form and detail can be made therein without departing from the spirit and scope of the invention. The inventors expect skilled artisans to employ such variations as appropriate, and the inventors intend the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

We claim:

1. A method for making an oat bran composition, comprising:

combining a starting oat bran concentrate with an acid and water to provide an oat bran slurry comprising about 1 to 5 wt. % oat bran in the oat bran slurry and a pH between 3 and 6, wherein the oat bran slurry comprises a first viscosity (measured at 70° C. and at a shear rate of 100 $s^{-1}$) prior to applying shear; and applying shear at a shear rate of at least about 60,000 $s^{-1}$ to the oat bran slurry to produce a reduced viscosity oat bran slurry comprising a second viscosity (measured at 70° C. and at a shear rate of 100 $s^{-1}$), wherein the second viscosity is at least about 40% lower than the first viscosity.

2. The method of claim 1, further comprising:

cooling the reduced viscosity oat bran slurry to less than about 45° C. by adding ambient temperature water to provide a cooled oat bran slurry;

mixing the cooled oat bran slurry with additional ingredients comprising gellan gum to provide a thickened oat bran slurry; and reducing a total solids content of the thickened oat bran slurry by adding water.

3. The method of claim 2 wherein the additional ingredients comprise at least one ingredient chosen from the group consisting of inulin, calcium carbonate, vegetable oil, and gum acacia.

4. The method of claim 1, further comprising adding a calcium salt to the reduced viscosity oat bran slurry to provide the reduced viscosity oat bran slurry with a second pH between 6 and 8 pH.

5. The method of claim 4, wherein the calcium salt comprises calcium carbonate, tricalcium phosphate, or combinations thereof.

6. The method of claim 2, comprising thermal processing the thickened oat bran slurry to provide the oat bran composition.

7. The method of claim 6, wherein the thermal processing comprises:

preheating the thickened oat bran slurry to at least about 77° C. to provide a preheated oat bran slurry;

heating the preheated oat bran slurry to at least about 139° C. for about 3 to 15 seconds to provide a heated oat bran slurry; flash-cooling the heated oat bran slurry to about 79 to 82° C. to provide a flash-cooled oat bran slurry;

homogenizing the flash-cooled oat bran slurry at about 2500 to 3500 psig to provide a homogenized oat bran slurry; and cooling the homogenized oat bran slurry to less than about 18° C. to provide the oat bran composition; and aseptically storing the oat bran composition.

8. The method of claim 1, further comprising homogenizing the oat bran slurry at a pressure of between about 2000 and 3500 psig.

9. The method of claim 1 wherein the method is conducted in the absence of hydrolysis of the oat bran concentrate.

* * * * *